United States Patent [19]
Keever et al.

[11] B 3,987,991
[45] Oct. 26, 1976

[54] PIPE RESTRAINTS FOR NUCLEAR POWER PLANTS

[75] Inventors: Robert E. Keever, Morgan Hill; Randolph Broman, Santa Clara; Serge Shevekov, Sunnyvale, all of Calif.

[73] Assignee: Nuclear Services Corporation, Campbell, Calif.

[22] Filed: Sept. 18, 1973

[21] Appl. No.: 398,488

[44] Published under the second Trial Voluntary Protest Program on February 24, 1976 as document No. B 398,488.

[52] U.S. Cl. ............................... 248/49; 138/106
[51] Int. Cl.² ....................................... F16L 3/12
[58] Field of Search .............. 248/49, 54 R, 54 CS; 137/343, 356; 60/39.31; 138/106, 112, 113, 114, DIG. 8, 11, 153, 172; 14/24; 52/86; 285/182; 174/81

[56] References Cited
UNITED STATES PATENTS

| | | | |
|---|---|---|---|
| 195,618 | 9/1877 | Levis | 138/113 |
| 1,646,423 | 10/1927 | Schaub | 248/49 |
| 1,818,961 | 8/1931 | Kramer | 248/49 |
| 2,113,083 | 4/1938 | Height | 248/49 |
| 2,425,033 | 8/1947 | Fletcher | 248/68 CB |
| 2,611,567 | 9/1952 | Williamson | 248/49 |
| 2,710,677 | 6/1955 | Ferris | 138/172 X |
| 2,774,384 | 12/1956 | Wallace | 138/172 X |
| 3,299,417 | 1/1967 | Sibthorpe | 138/114 X |
| 3,359,587 | 12/1967 | Pleasants | 14/24 X |
| 3,439,107 | 4/1969 | Scott | 52/86 X |
| 3,473,829 | 10/1969 | Daniels | 248/74 B X |
| 3,643,005 | 2/1972 | Matthews | 138/106 X |
| 3,734,138 | 5/1973 | Brown et al. | 248/49 X |
| 3,791,416 | 2/1974 | Ziemek et al. | 138/112 |

FOREIGN PATENTS OR APPLICATIONS

| | | | |
|---|---|---|---|
| 167,110 | 5/1959 | Sweden | 138/106 |

*Primary Examiner*—Roy D. Frazier
*Assistant Examiner*—Rodney H. Bonck
*Attorney, Agent, or Firm*—Jack M. Wiseman

[57] ABSTRACT

A pipe restraint for nuclear power plants in which a support member is anchored on supporting surface. Formed in the support member is a semicylindrical wall. Seated on the semicylindrical wall is a ring-shaped pipe restrainer that has an inner cylindrical wall. The inner cylindrical wall of the pipe restrainer encircles the pressurized pipe. In a modification of the pipe restraint, an arched-shaped pipe restrainer is disposed to overlie a pressurized pipe. The ends of the arch-shaped pipe restrainer are fixed to support members, which are anchored in concrete or to a supporting surface. A strap depends from the arch-shaped pipe restrainer. The pressurized pipe is supported by the depending strap.

1 Claim, 5 Drawing Figures

— 1 —

PIPE RESTRAINTS FOR NUCLEAR POWER PLANTS

BACKGROUND OF THE INVENTION

The present invention relates in general to nuclear power plants and more particularly to restraints for pipes carrying high energy fluid.

In nuclear power plants, there are pipes that carry high energy fluid in the form of steam from inside the reactor containment building to the main turbine in the turbine building and hot feedwater back from the turbine condenser. Other pipes carrying high energy fluid are equally applicable. The effects of the rupture of the pipes carrying high energy fluid are to be obviated. Toward this end, protection against excessive displacement and movement of the pipes is required.

Heretofore, high energy fluid pipe restraints were fabricated generally from structural members. Such structural members were heavy, bulky, expensive and difficult to install.

SUMMARY OF THE INVENTION

A restraint for pipes carrying high energy fluid in which the pipe carrying high energy fluid is encircled by the inner cylindrical wall of a ring-shaped pipe restrainer.

A restraint for pipes carrying high energy fluid in which the pipe carrying high energy fluid is restrained by an arch-shaped pipe restrainer.

By virtue of the present invention, the pipe restrainers can be prefabricated. The pipe restrainers of the present invention can be installed with facility about existing pipes carrying high energy fluid without reducing or obstructing critical clearances.

A feature is that the pipe restrainers of the present invention can be stiffened to any desired degree by disposing a plurality of stacked pipe restrainers concentrically one within another.

Another feature of the present invention is the obviating of the need for special shimming plates and the shimming can be done at any desired location.

When the pipes carrying high energy fluid are subjected to shock load, the restrainers of the present invention provide a spring action for inhibiting excessive displacements and movement by absorbing the shock energy. Additionally, the pipe restrainers of the present invention lend themselves to a variety of installation combinations and can accommodate various size pipes. The smooth exterior of the pipe restrainers of the present invention simplify maintenance, inspection and security.

DETAILED DESCRIPTION OF THE PREFERRED EMBODIMENTS

Figure 1:
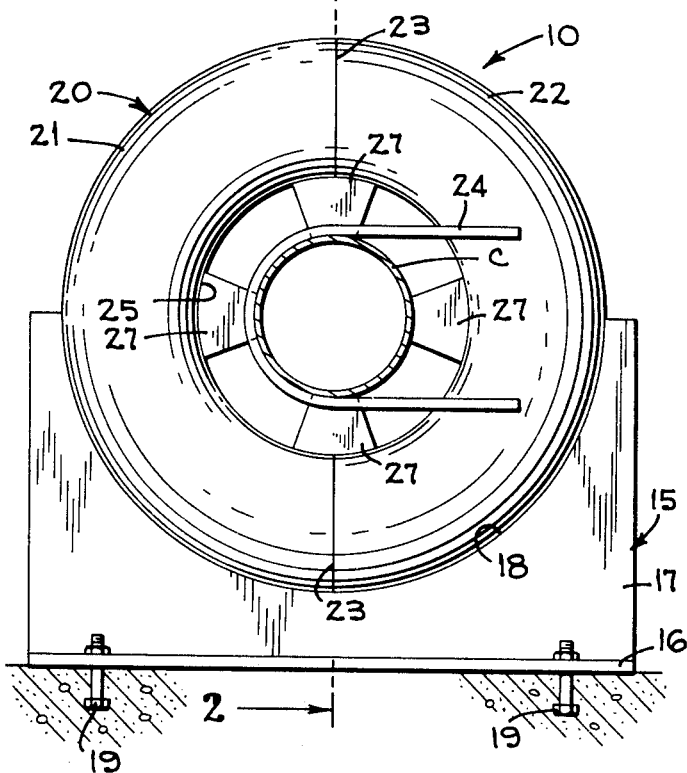
FIG. 1 is an elevation view of a restraint embodying the present invention for pipes carrying high energy fluid.
Figure 2:
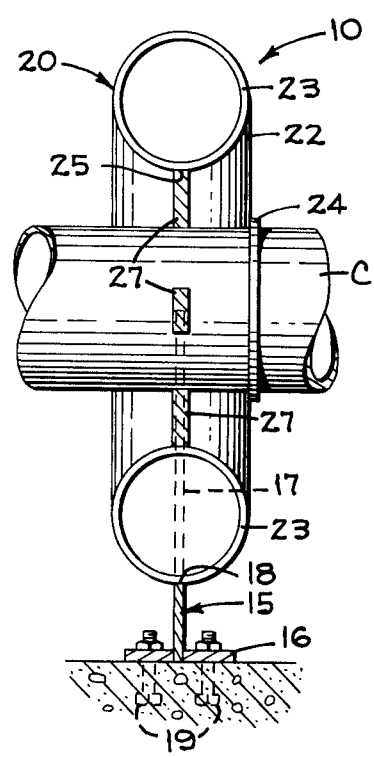
FIG. 2 is a vertical sectional view of the restraint shown in FIG. 1 taken along line 2—2 of FIG. 1.

Illustrated in FIGS. 1 and 2 is a restraint 10 embodying the present invention for restraining pipes C carrying high energy fluid against excessive displacements and movements. The restraint 10 comprises a supporting member 15 that includes a base 16 and an upright section 17. In the preferred embodiment, the support member 15 is made of steel. The base 16 is anchored in concrete, structured steel or any other suitable supporting surface by means of depending bolts 19 or welds. As shown in FIG. 1, the upright section 17 has formed therein a semicylindrical wall 18. The wall 18 can have any suitable configuration.

Seated on the supporting member 15 is a ring-shaped restrainer 20 at the cylindrical wall 18. In the exemplary embodiment, the restrainer 20 is made of steel. Preferably, the restrainer 20 is assembled from prefabricated semi-toroidal hollow tubes or 180° returns 21 and 22. The semi-torodial hollow tubes 21 and 22 are welded together at the circular walls 23 surrounding their confronting openings. The restrainer 20 is fixedly secured to the support member 15 by suitable means, such as welding.

The restrainer 20 encircles the pipe C, which pipe conducts high energy fluids. For further securing and positioning the pipe C, steel band straps 24 may be employed to be trained around the pipe C with its free ends secured to the restrainer 20. In order to provide a tight fit between the pipe C and the inner cylindrical wall 25 of the restrainer 20, shims 27 may be inserted therebetween.

For additional stiffening of the restraint 10, a plurality of restrainers, such as restrainers 28 and 29 (FIG. 5) are disposed concentrically within the restrainer 20. The restrainers 20, 28 and 29 are similar in construction with the diameters thereof decreasing with respect to location inwardly of the restrainer 20.

Figure 3:
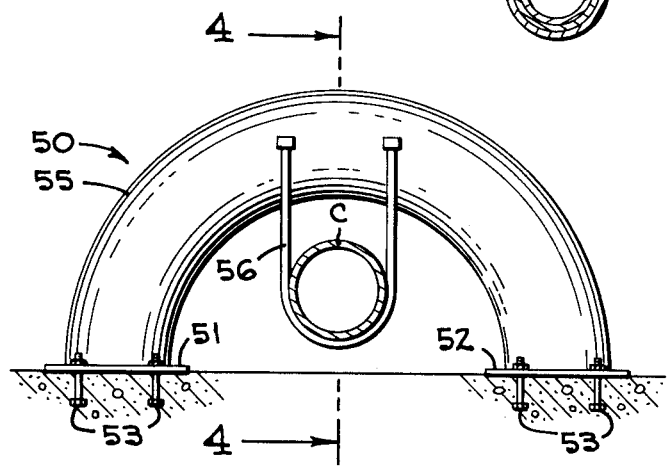
FIG. 3 is an elevation view of a modification of the restraint embodying the present invention for pipes carrying high energy fluid.
Figure 4:
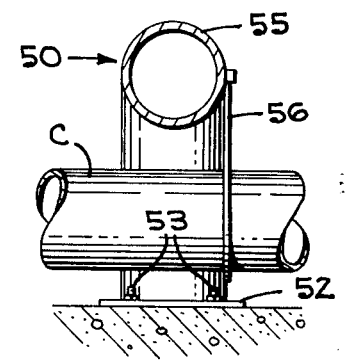
FIG. 4 is a vertical sectional view of the restraint shown in FIG. 3 taken along line 4—4 of FIG. 3.

Illustrated in FIG. 3 and 4 is a restraint 50 for pipes carrying high energy fluids. The restraint 50 comprises support members 51 and 52. Depending from the support members 51 and 52 are anchor bolts 53 embedded in concrete for anchoring the support member 51 and 52. Alternatively, the support members 51 and 52 may be secured to structured steel by welding. This is also equally applicable to the support member 15 of FIG. 1.

Fixed to the support members 51 and 52 by welding is a semi-toroidal or arch-shaped restrainer 55. The arch-shaped restainer 55 is made of suitable material, such as steel. Centrally located under the arch-shaped restrainer 55 is the pipe C for conducting high energy fluid. In supporting the pipe C, a steel band strap 56 may be trained around the pipe C and has its free ends fixed to the arch-shaped restrainer 55. Shims may be provided in a manner similar to that shown in FIG. 1.

Figure 5:
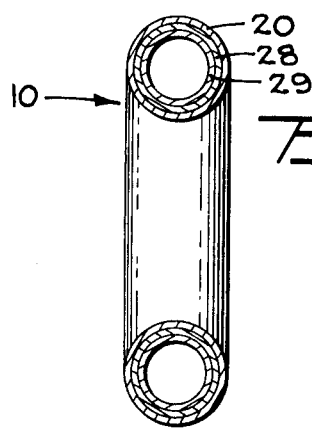
FIG. 5 is a view similar to FIG. 2 with a plurality of restrainers disposed concentrically within the restrainer shown in FIGS. 1 and 2.

In a manner similar to that shown in FIG. 5, the arch-shaped restrainer 55 can be stiffened by inserting therein a plurality of similar restrainers or 180° returns with smaller diameters and disposed concentrically within the arch-shaped restrainer 55.

We claim:

1. A restraint for a pipe comprising:
   a. a rigid arcuate restrainer overlying a pipe, said arcuate restrainer being in the form of a toroid with an inner wall and an outer wall, said inner wall thereof being arranged to surround the pipe;

b. means on said restrainer for controlling the displacement of the pipe;
c. a supporting member fixed to a supporting surface for supporting said restrainer; and
d. a plurality of additional toroidal restraints, each having outer and inner walls, each successive one of said additional restrainers being of progressively decreasing cross-sectional area, each progressively smaller restrainer being disposed concentrically within the preceding restrainer between the outer and inner walls thereof, and said plurality of additional toroidal restrainers being disposed concentrically within said arcuate restrainer between the inner wall and the outer wall thereof to stiffen said arcuate restrainer.

* * * * *